United States Patent
Alshinnawi et al.

(10) Patent No.: US 10,552,229 B2
(45) Date of Patent: Feb. 4, 2020

(54) SYSTEMS AND METHODS FOR DETERMINING PLACEMENT OF COMPUTING WORKLOADS WITHIN A NETWORK

(71) Applicant: Lenovo Enterprise Solutions (Singapore) Pte. Ltd., New Tech Park (SG)

(72) Inventors: Shareef F. Alshinnawi, Apex, NC (US); Gary D. Cudak, Wake Forest, NC (US); Ajay Dholakia, Cary, NC (US); John M. Petersen, Wake Forest, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 107 days.

(21) Appl. No.: 15/348,969

(22) Filed: Nov. 10, 2016

(65) Prior Publication Data

US 2018/0129541 A1    May 10, 2018

(51) Int. Cl.
| | |
|---|---|
| *G06F 9/50* | (2006.01) |
| *G06F 9/455* | (2018.01) |
| *H04L 12/24* | (2006.01) |
| *H04L 29/08* | (2006.01) |

(52) U.S. Cl.
CPC ........ *G06F 9/5083* (2013.01); *G06F 9/45558* (2013.01); *H04L 41/12* (2013.01); *H04L 41/147* (2013.01); *G06F 2009/4557* (2013.01); *H04L 67/10* (2013.01)

(58) Field of Classification Search
CPC ............................ G06F 9/45558; G06F 9/5033
See application file for complete search history.

(56) References Cited

U.S. PATENT DOCUMENTS

| | | | |
|---|---|---|---|
| 9,052,935 B1 * | 6/2015 | Rajaa | G06F 9/5033 |
| 9,336,030 B1 * | 5/2016 | Marr | G06F 9/45533 |
| 2014/0215076 A1 * | 7/2014 | Grothues | G06F 9/455 709/226 |
| 2016/0350146 A1 * | 12/2016 | Udupi | G06F 9/45558 |
| 2016/0359668 A1 * | 12/2016 | Udupi | G06F 9/45558 |
| 2017/0060707 A1 * | 3/2017 | Harper | G06F 11/2033 |
| 2017/0097845 A1 * | 4/2017 | Kouznetsov | G06F 9/45558 |

* cited by examiner

*Primary Examiner* — James J Lee
*Assistant Examiner* — Jorge A Chu Joy-Davila
(74) *Attorney, Agent, or Firm* — Olive Law Group, PLLC

(57) ABSTRACT

Systems and methods for determining placement of computing workloads within a network are disclosed. According to an aspect, a method includes determining one or more attributes of a computing workload to be placed within a network. The method also includes predicting interaction of the computing workload with one or more other computing workloads within the network based on the one or more attributes. Further, the method includes determining placement of the computing workload within the network based on the predicted interaction and a topology of the network.

16 Claims, 2 Drawing Sheets ized signals such as a carrier wave or other propagation medium via a wired or wireless network, wireline, optical fiber cable, RF, or any other such medium or combination of the foregoing).

SYSTEMS AND METHODS FOR DETERMINING PLACEMENT OF COMPUTING WORKLOADS WITHIN A NETWORK

TECHNICAL FIELD

The present subject matter relates to computing workload management. More specifically, the present subject matter relates to systems and methods for determining placement of computing workloads within a network.

BACKGROUND

Many datacenters and other such networked environments employ virtualization, where self-contained operating systems or other computing workloads having various software stacks are deployed to run on computing systems. Such computing workloads include virtual machines (VMs) and VM images. A VM is an emulation of a computing system or device. Often, multiple VMs interact in some capacity. For example, one VM may contain a database application, such as the MySQL open source relational database management system, which another contains web application software which utilizes the database.

Sometimes the placement of computing workloads on the network is not optimal. Particularly, computing workloads may not be optimally placed in the instance of large networks with many switches and multiple tiers. These situations can lead to increased latency and overall increased bandwidth utilization, resulting in lower overall performance. Therefore, there is a need for improved systems and techniques for placing computing workloads within networks.

SUMMARY

Disclosed herein are systems and methods for determining placement of computing workloads within a network. According to an aspect, a method includes determining one or more attributes of a computing workload to be placed within a network. The method also includes predicting interaction of the computing workload with one or more other computing workloads within the network based on the one or more attributes. Further, the method includes determining placement of the computing workload within the network based on the predicted interaction and a topology of the network.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
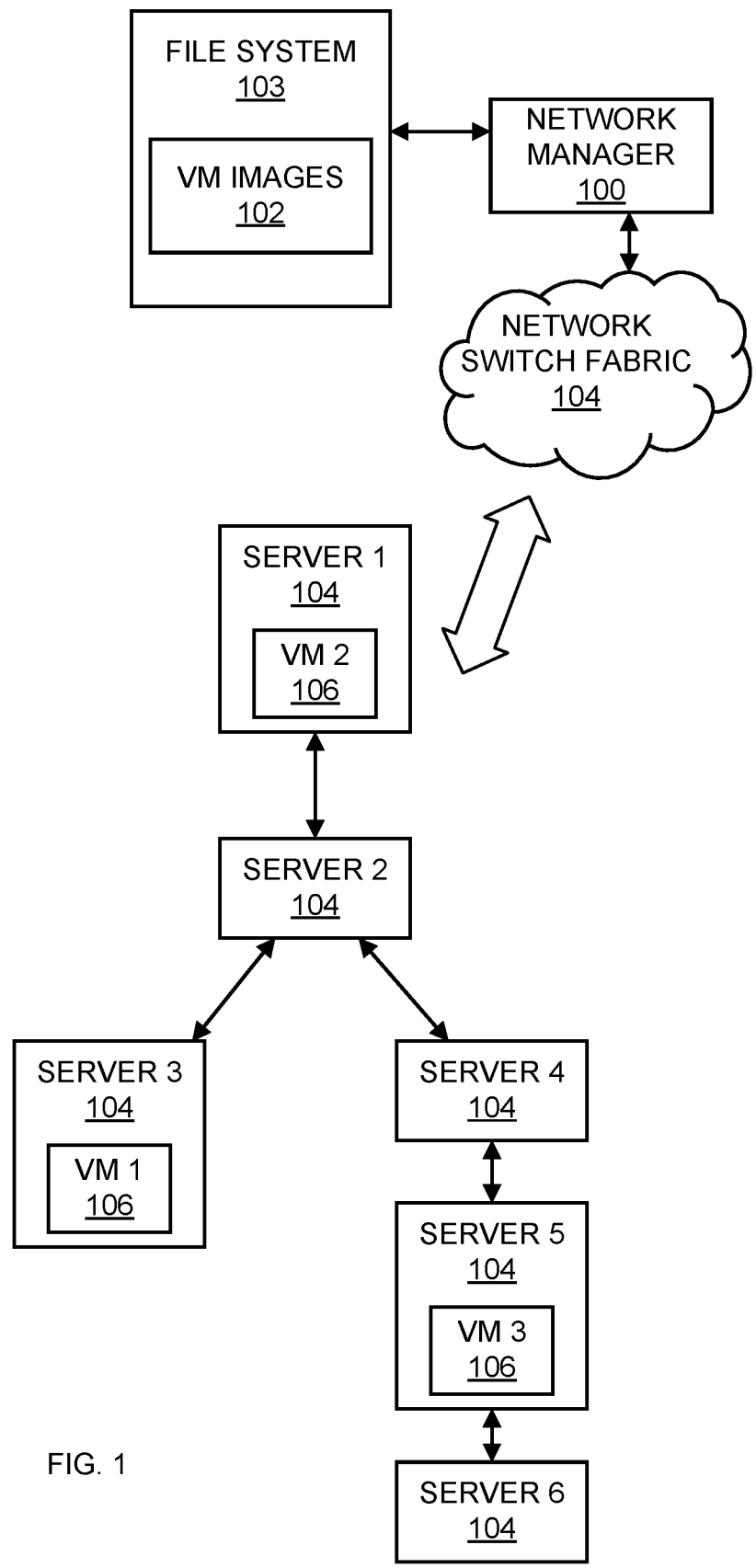
FIG. 1 is a block diagram of an example system configured with a workload manager for determining placement of workloads within a network in accordance with embodiments of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the computing device and achieve the stated purpose of the computing device.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, ROM and RAM.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the term "computing device" should be broadly construed. It can include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

The presently disclosed subject matter can be used for optimally placing computing workloads within a network. Particularly, systems and methods disclosed herein can determine placement of a computing workload within the network based on predicted interaction among computing workloads within the network and a topology of the network. The systems and methods disclosed herein may applied to, for example, datacenter environments.

As referred to herein, a network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

As referred to herein, a virtual machine can be an emulation of a computing device or computing system. Virtual machines can be based on computing architectures and provide functionality of a physical computing device. Their implementations may involve specialized hardware, software, firmware, or combinations thereof. Virtual machines may be a type of workload implemented and managed within a network. An image of a virtual machine may be a copy of the virtual machine, which may contain an operating system (OS), data files, and applications. The data files may be of any suitable file type and have a directory structure.

In accordance with embodiments, FIG. 1 illustrates a block diagram of an example system configured with a workload manager 100 for determining placement of workloads within a network. The workload manager 100 is configured to determine one or more attributes of a computing workload to be placed within a network, to predict interaction of the computing workload with at least one other computing workload within the network based on the one or more attributes, to determine placement of the computing workload within the network based on the predicted interaction and a topology of the network, and to place the computing workload within the network according to the determined placement. The workload manager 100 may reside in a server or any other suitable computing device. In an example, the workload manager 100 may be implemented via software, hardware, firmware, or combinations thereof.

The workload manager 100 is configured to place or deploy virtual machine instances from virtual machine images 102 in a file system 103 onto the physical resources of one of physical servers 1-6 104. It is noted that although virtual machines are described by example herein as being placed on networked computing devices, it should be appreciated that the systems and methods disclosed herein may be similarly be used for placing any type of computing workloads within a network based on predicted interaction and topology of the network.

The network controller 100 or another component may generally maintain network state data describing a state of network resources within a network switch fabric 104. In this example, each server 104 may include one or more virtual machine and a virtual switch. Generally, the virtual switch can facilitate network communication of virtual machines on the switch fabric network 104. It should be noted that such an environment may include any number and configuration of servers with any suitable number of virtual machines deployed (e.g., a server that includes only a single virtual machine, a bare metal server in which the virtual machine is installed directly onto the hardware of the server rather than within an operating system of the server, etc.). For simplicity of illustration, virtual machines 1-3 106 are shown as being deployed within the set of networked servers 104. These virtual machines 106 are configured for interaction with each other through the network switch fabric 104.

The workload manager 100 may receive requests to deploy a virtual machine image 102 as a virtual machine 106 on the servers 104. For example, such a request may be submitted by a user using an application programming interface (API). Upon receipt of a request to deploy or place one or more virtual machine images 102, the workload manager 100 may determine one or more attributes of each of the respective virtual machine(s). Subsequently, the workload manager 100 may predict interaction of the virtual machines with each other or other virtual machines within the network based on the attributes. The workload manager 100 may determine placement of the virtual machines based on the predicted interaction and topology of the network. The workload manager 100 may maintain network topology information for the network switch fabric 104 and for use in determining placement of the virtual machines in accordance with embodiments disclosed herein.

Figure 2:
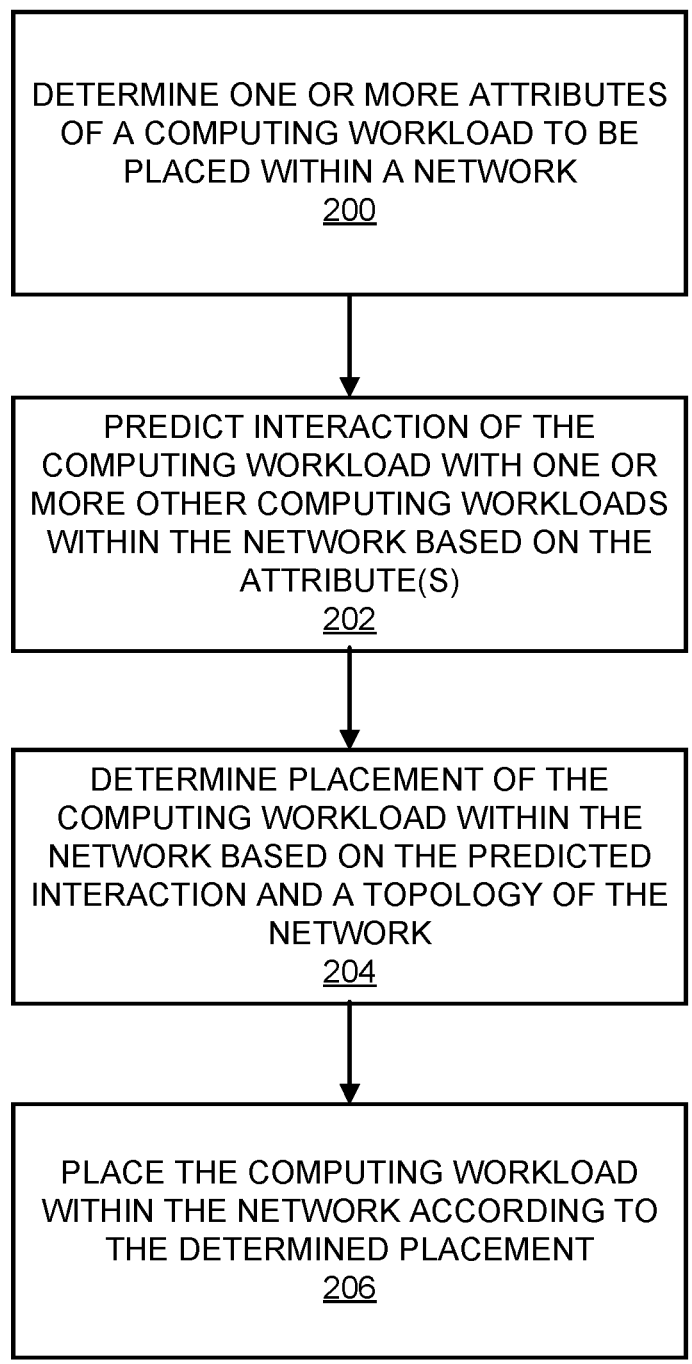
FIG. 2 is a flowchart of an example method for determining placement of computing workloads within a network in accordance with embodiments of the present disclosure.

FIG. 2 illustrates a flowchart of an example method for determining placement of computing workloads within a network in accordance with embodiments of the present disclosure. It is noted that this example method is described as being implemented by the workload manager 100 shown in FIG. 1; however, it should be understood that the method may be implemented by any suitable computing device operably configured with a network.

Referring to FIG. 2, the method includes determining 200 one or more attributes of a computing workload to be placed within a network. For example, the workload manager 100 shown in FIG. 1 may determine one or more attributes of a virtual machine to be placed within the network of servers 104. In an example, the workload manager 100 may determine software to be executed by the virtual machine. In another example, the workload manager 100 may determine one or more files associated with the virtual machine. In yet another example, the workload manager 100 may determine a file type, a directory structure, and/or the like of the file(s) associated with the virtual machine. In this way, the workload manager 100 determine a software context of the workload. Particularly, the workload manager 100 can determine a catalog of software of software installed on a virtual machine (e.g., Microsoft application server, PostreSQL, etc.). The workload manager 100 can determine a software context based on one or more files includes with the virtual machine (e.g., based on the file names, file types, directory structures, etc.). The workload manager 100 can also determine a software context based on one or more user accounts within the virtual machine (e.g., associated with specific application usage, customers, users, etc.). In yet another example, the workload manager 100 may determine one of an expected use and a user of the virtual machine for determining attributes.

The method of FIG. 2 also includes predicting 202 interaction of the computing workload with one or more other computing workloads within the network based on the attribute(s). Continuing the aforementioned example of FIG. 1, the workload manager 100 may predict interaction among multiple virtual machines within the network based on the attributes of the virtual machines. For example, the workload manager 100 may receive a request for placing one or more of virtual machines 1-3 106 on servers 104. The workload manager 100 may predict interaction of the virtual machines 106 based on their attributes.

In an example of predicting interaction, the workload manager 100 may determine a likelihood of workload associated with another virtual machine 106 being in a queue for interaction with one of the virtual machines 106. A higher likelihood will indicate more interaction than a lower likelihood. In this way, the workload manager 100 can determine an interaction probability among virtual machines or other workloads.

In another example of predicting interaction, the workload manager 100 may predict interaction based on user cases for a type of the computing workload and a type of one or more of other computing workloads. For example, the workload manager 100 may calculate a probability of interaction based on known software use cases (e.g., any SQL servers and any application servers).

In another example of predicting interaction, the workload manager 100 may predict interaction based on one or more of a historical measurement of computing workload interactions and a user setting. For example, the workload manager 100 may collect measurements of interaction between virtual machines to make a prediction about future interactions. For example, the workload manager 100 may determine that software A interacts with software B a certain percentage of the time. This calculation may be used for predictions about future interactions between like virtual machines. Also, for example, the workload manager 100 may have interaction probabilities set by an administrator or software provider.

In yet another example of predicting interaction, the workload manager 100 may score a probability based on any combination of aligning context. For example, virtual machines may have a common user, similar software, common files, and the like. The probability score can be higher if the context or attributes of virtual machines or other computing workloads are closely aligned. In an example, a virtual machine may have the following probability scores: 10 points for common user, 20 points for software alignment, and 30 points for common files. In this case, the virtual machines probability score with respect to the comparison virtual machines is 60 points.

The method of FIG. 2 includes determining 204 placement of the computing workload within the network based on the predicted interaction and a topology of the network. Continuing the aforementioned example of FIG. 1, the workload manager 100 may determine placement of one or all of the virtual machines 106 based on predicted interaction and a topology of the network of servers 104. In an example, the workload manager 100 may know a relation of the servers 104 and various other components in the network. In this way, the workload manager 100 can know when placement of a virtual machine in one server is close to another virtual machine.

In an example of determining placement, the workload manager 100 may determine placement based on a probability score of interaction of one virtual machine with another. The table below shows exemplary probability scores of interaction virtual machines 106 with respect to each other.

| Image 1 | Image 2 | Score |
|---------|---------|-------|
| VM 1    | VM 2    | 40    |
| VM 3    | VM 2    | 50    |
| VM 1    | VM 3    | 10    |

The workload manager 100 may determine placement of virtual machines 1-3 106 based on the probability scores. In this example, virtual machines 2 and 3 would be placed closest together, since their score of 50 is highest. Conversely, virtual machines 1 and 3 106 may be placed furthest apart, since their score is 10.

The method of FIG. 2 also includes placing 206 the computing workload within the network according to the determined placement. Continuing the aforementioned example, the workload manager 100 may place the virtual machines 106 in accordance with the determined placement.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
determining, by a processor, one or more attributes of a computing workload to be placed within a computing network, wherein the computing workload comprises one of a virtual machine and image of a computing system;
determining, by the processor, a topology of the computing network;
determining, by the processor, an interaction between the computing workload and another computing workload within the computing network based on the one or more attributes;
determining an interaction score between the computing workload and another computing workload within the computing network, wherein the interaction score comprises a summation of a combination of common computing context between the computing workloads within the computing network, wherein the common computing context includes any one of a common user, a common software, and a common file;
wherein the interaction score is higher when the summation of the combination of common computing context is greater as compared to when the summation of the common computing context are different;
wherein determining an interaction of the computing workload comprises determining the interaction based on a historical measurement of computing workload interactions, the common computing context, and a user setting; and
determining placement of the computing workload within the network based on the historical measurement of computing workload interactions, the interaction score, and the topology of the network, wherein the computing workloads are placed next to each other when the interaction score is higher, and the computing workloads are placed away from each other when the interaction score is lower; and
deploying the computing workload placement within the topology of the computing network according to the determined placement of the computing workload.

2. The method of claim 1, wherein the network is configured according to a hierarchical internetworking model.

3. The method of claim 1, wherein the network comprises a plurality of computing devices and switches configured in accordance with the topology.

4. The method of claim 1, wherein determining one or more attributes of a computing workload comprises determining software to be executed by the workload.

5. The method of claim 1, wherein determining one or more attributes of a computing workload comprises determining one or more files associated with the workload.

6. The method of claim 5, wherein determining one or more attributes of a computing workload comprises determining one of the file type and directory structure of the one or more files.

7. The method of claim 1, wherein determining one or more attributes of a computing workload comprises determining one of an expected use of the computing workload and a user of the computing workload.

8. The method of claim 1, wherein determining an interaction of the computing workload comprises determining a likelihood of the at least one other computing workload being in a queue for interaction with the computing workload.

9. The method of claim 1, wherein determining an interaction of the computing workload comprises determining the interaction based on user cases for a type of the computing workload and a type of the at least one other computing workload.

10. The method of claim 1, wherein determining an interaction of the computing workload comprises determining a likelihood of interaction with each of a plurality of other computing workloads, and
wherein determining placement comprises determining placement of the computing workload within the network based on the likelihood of interaction with each of the plurality of other computing workloads.

11. The method of claim 10, further comprising deploying the computing workload closest to the computing workload having the highest likelihood of interaction among the plurality of other computing workloads.

12. The method of claim 1, further comprising placing the computing workload within the network according to the determined placement.

13. A system comprising:
a workload manager comprising at least one processor and memory that:
determines one or more attributes of a computing workload to be placed within a computing network, wherein the computing workload comprises one of a virtual machine and image of a computing system;
determines a topology of the computing network;
determines an interaction between the computing workload and another computing workload within the computing network based on the one or more attributes, wherein the workload manager determines the interaction based on a historical measurement of computing workload interactions and a user setting;
determines an interaction score between the computing workload and another computing workload within the computing network, wherein the interaction score comprises a combination of common computing context between the computing workloads within the computing network, wherein the common computing context includes any one of a common user, a common software, and a common file,
wherein the interaction score is higher when the summation of the combination of common computing context is greater as compared to when the summation of the common computing context are different;
determines placement of the computing workload within the computing network based on the interaction, the interaction score, and the topology of the computing network, wherein the computing workloads are placed next to each other when the interaction score is higher, and the computing workloads are placed away from each other when the interaction score is lower; and
deploys the computing workload placement within the topology of the computing network according to the determined placement of the computing workload.

14. The system of claim 13, wherein the workload manager determines the interaction based on user cases for a type of the computing workload and a type of the at least one other computing workload.

15. The system of claim 13, wherein the workload manager determines a likelihood of interaction with each of a plurality of other computing workloads; and
determines placement of the computing workload within the network based on the likelihood of interaction with each of the plurality of other computing workloads.

16. The system of claim 15, wherein the workload manager deploys the computing workload closest to the computing workload having the highest likelihood of interaction among the plurality of other computing workloads.

* * * * *